US012682728B2

(12) United States Patent
Wakuda

(10) Patent No.: US 12,682,728 B2
(45) Date of Patent: Jul. 14, 2026

(54) HAPTIC OUTPUT DEVICE AND METHOD FOR PROVIDING HAPTIC OUTPUT

(71) Applicant: ALPS ALPINE CO., LTD., Tokyo (JP)

(72) Inventor: Hiroshi Wakuda, Miyagi (JP)

(73) Assignee: ALPS ALPINE CO., LTD., Tokyo (JP)

( * ) Notice: Subject to any disclaimer, the term of this patent is extended or adjusted under 35 U.S.C. 154(b) by 247 days.

(21) Appl. No.: 18/469,848

(22) Filed: Sep. 19, 2023

(65) Prior Publication Data

US 2024/0135790 A1 Apr. 25, 2024
US 2024/0233499 A9 Jul. 11, 2024

(30) Foreign Application Priority Data

Oct. 25, 2022 (JP) ................................. 2022-170814

(51) Int. Cl.
*G08B 6/00* (2006.01)
*G06F 3/01* (2006.01)

(52) U.S. Cl.
CPC .............. *G08B 6/00* (2013.01); *G06F 3/016* (2013.01)

(58) Field of Classification Search
CPC .............. G08B 6/00; G06F 3/016; G06F 3/01
See application file for complete search history.

(56) References Cited

U.S. PATENT DOCUMENTS

2016/0018294 A1* 1/2016 Moriya ................. G01M 17/04
73/11.07
2016/0239089 A1 8/2016 Taninaka et al.

2020/0150767 A1* 5/2020 Karimi Eskandary ......................
H04M 1/0202
2021/0260621 A1* 8/2021 Lee .......................... G06F 3/016
2021/0263590 A1* 8/2021 Lee .......................... G06F 3/016
2023/0198442 A1* 6/2023 Shirashima ............. G06F 3/016
318/114

FOREIGN PATENT DOCUMENTS

CN 110083229 A * 8/2019 ........... G06F 3/0416
JP 2020-077415 5/2020
JP 2024062754 A * 5/2024 .............. G06F 3/01
WO 2015/083283 6/2015

OTHER PUBLICATIONS

Japanese Office Action for 2022-170814 mailed on Mar. 24, 2026.

* cited by examiner

*Primary Examiner* — Quan Zhen Wang
*Assistant Examiner* — Mancil Littlejohn, Jr.
(74) *Attorney, Agent, or Firm* — IPUSA, PLLC

(57) ABSTRACT

A haptic output apparatus includes a vibration system having one or more resonance frequencies, the vibration system including an actuator configured to vibrate in accordance with an input signal, and including an object coupled to the actuator and configured to be excited in response to the vibration of the actuator. The haptic output apparatus includes a controller configured to control driving of the actuator. The controller corrects a drive signal using at least one correction model to output the corrected drive signal to the actuator as the input signal, the correction model being preliminarily generated based on the resonance frequencies. Alternatively, the controller outputs a control signal to the actuator as the input signal, the control signal being preliminarily generated using the correction model.

11 Claims, 14 Drawing Sheets

100

HAPTIC OUTPUT DEVICE AND METHOD FOR PROVIDING HAPTIC OUTPUT

CROSS-REFERENCE TO RELATED APPLICATIONS

This application claims priority to Japanese Patent Application No. 2022-170814, filed Oct. 25, 2022, the entire contents of which are incorporated herein by reference.

BACKGROUND

1. Field of the Invention

The present disclosure relates to a haptic output device and a method for providing haptic output.

2. Description of the Related Art

A conventional haptic-enabled device includes a haptic actuator, a movement sensor, and a control circuit. The control circuit determines a drive signal for the haptic actuator, based on a desired movement for a haptic effect and a model that describes a transient behavior of the haptic actuator. The control circuit also detects the movement that is output by the haptic actuator, based on the drive signal that is applied to the haptic actuator. The control circuit further determines a movement error indicating a difference between the detected movement and the desired movement, and then controls the drive signal based on the movement error to generate the controlled drive signal. The controlled drive signal is applied to the haptic actuator to generate the haptic effect (see Patent Document 1).

RELATED-ART DOCUMENT

Patent Document

[Patent Document 1] Japanese Unexamined Patent Application Publication No. 2020-77415

When a vibration system including an actuator has resonance frequencies, it is not easy to provide a good haptic feedback because haptic feedbacks are influenced by vibrations at the resonance frequencies. In the conventional haptic-enabled device, the effect of the resonance frequencies of the vibration system including the actuator is not considered sufficiently.

In view of the situation described above, an object of the present disclosure is to provide a haptic output device and a method for providing a haptic output that are capable of providing a good haptic output, in a case where a vibration system including an actuator has one or more resonance frequencies.

SUMMARY

In a first manner of the present embodiment, a haptic output apparatus includes a vibration system having one or more resonance frequencies, the vibration system including an actuator configured to vibrate in accordance with an input signal, and including an object coupled to the actuator and configured to be excited in response to the vibration of the actuator. The haptic output apparatus includes a controller configured to control driving of the actuator. The controller is configured to correct a drive signal using at least one correction model to output the corrected drive signal to the actuator as the input signal, the correction model being preliminarily generated based on the resonance frequencies. Alternatively, the controller is configured to output a control signal to the actuator as the input signal, the control signal being preliminarily generated using the correction model.

In a second manner of the present embodiment, a method for providing a haptic output using a haptic output apparatus is provided. The haptic output apparatus includes a vibration system having one or more resonance frequencies, the vibration system including an actuator and an object configured to be excited in response to vibration of the actuator. The method includes (i) correcting a drive signal using a correction model to output the corrected drive signal to the actuator, the correction model being preliminarily generated based on the resonance frequencies or (ii) outputting a control signal to the actuator as an input signal, the control signal being preliminarily generated using the correction model.

DETAILED DESCRIPTION

One or more embodiments of the present disclosure will be described using a haptic output device and a method for providing haptic output.

In the following description, a defined XYZ coordinate system is used. A direction parallel to an X-axis (X-direction), a direction parallel to a Y-axis (Y-direction), and a direction parallel to a Z-axis (Z-direction) are mutually perpendicular. In the following description, for convenience of description, −Z direction-side may be referred to as a lower side or downward, and +Z direction-side may be referred to as an upper side or upward. However, these are not intended to mean a general vertical relationship. In the following description, a plan view refers to a view taken along an XY plane.

In the following, a length, a thickness, a thickness, or the like of each portion may be exaggerated for the purpose of facilitating the understanding of a given configuration. In addition, the terms "parallel," "upper," "lower," and the like cover the extent to which the effect of one or more embodiments is not impaired.

Embodiments

Figure 1:
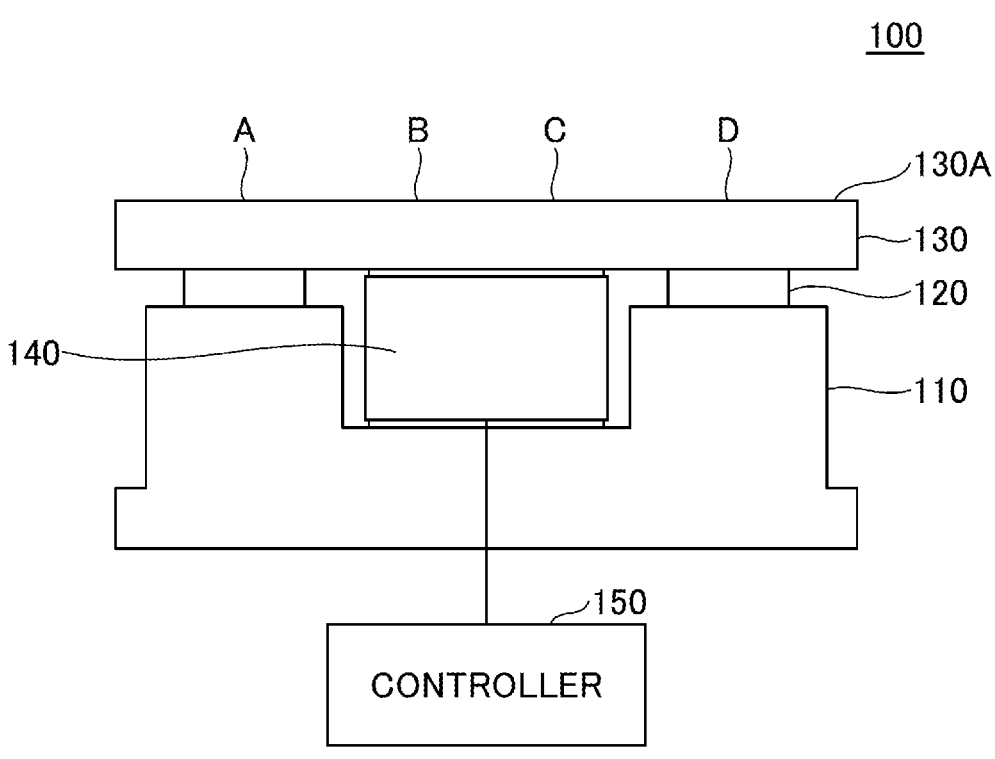
FIG. 1 is a diagram illustrating a configuration example of a haptic output device according to an embodiment.

FIG. 1 is a diagram illustrating a configuration example of a haptic output device 100 according to an embodiment. The haptic output device 100 includes a securing member 110, an elastic member 120, a panel 130, an actuator 140, and a controller 150.

The panel 130 is an example of an object to be excited. A vibration system including the actuator 140 and the panel 130 is an example of a first vibration system. A vibration system including the panel 130 and the securing member 110 is an example of a second vibration system. A vibration system of the entire haptic output device 100 includes the vibration system (which is an example of the first vibration system) including the actuator 140 and the panel 130, and includes the vibration system (which is an example of the second vibration system) including the panel 130 and the securing member 110. The vibration system (which is an example of the first vibration system) including the actuator 140 and the panel 130 differs from the vibration system (which is an example of the second vibration system) including the panel 130 and the securing member 110 in one or more resonance frequencies. In this case, the vibration system of the entire haptic output device 100 has at least two resonance frequencies.

The haptic output device 100 is mounted on an electronic device, such as a tablet computer, a smartphone, or a game machine that is used by an individual user, and the haptic output device 100 may be provided in an operation unit in the electronic device. The haptic output device 100 may be also provided in an operation unit of an electronic device, which is mounted on a moving thing such as a vehicle, a train, or an aircraft. In addition, the haptic output device 100 may be provided, for example, in a tablet-type input device or an input unit of electronic equipment such as an automatic teller machine (ATM), where the tablet-type input device or the electronic equipment is disposed in a store, a facility, or the like, and is used by an unspecified number of users.

The securing member 110 is a portion that is secured to an electronic device in which the haptic output device 100 is provided. The panel 130 is attached to the securing member 110 via an elastic member 120. The actuator 140 may be attached to the securing member 110.

The elastic member 120 is a member that elastically holds the panel 130 with respect to the securing member 110, and includes a member having elasticity such as rubber. The elastic member 120 may serve as a suspension device that damps the vibration that occur between the securing member 110 and the panel 130.

As an example, the panel 130 is a portion that receives a touch operation through an operator, and an upper surface of the panel 130 is an operation surface 130A. FIG. 1 illustrates operation positions A to D on the operation surface 130A. The panel 130 may be integrated with a touch panel. The operation surface 130A is, for example, an upper surface of a plate member made of resin or glass.

The actuator 140 has a lower end that is secured to the securing member 110, and has an upper end that is secured to the lower surface of the panel 130 with adhesion or the like. An example of the actuator 140 is a linear resonant actuator (LRA), but may be a vibration accumulation-type vibrating element, other than the LRA. In addition, the actuator 140 may be a linear actuator such as a voice coil motor, which is not of the vibration accumulation type. That is, the first vibration system may not have any resonance frequencies, and the second vibration system may have different resonance frequencies. The actuator 140 is driven under the control of the controller 150 to vibrate the panel 130. The actuator 140 may not be secured to the securing member 110. In this case, the actuator 140 may be suspended from the lower surface of the panel 130.

The controller 150 is implemented by a computer that includes a central processing unit (CPU), a random access memory (RAM), a read only memory (ROM), an input-and-output interface, an internal bus, and the like. For example, the controller 150 is implemented by a micro controller unit (MCU). The controller 150 controls the drive of the actuator 140. When the panel 130 includes a touch panel, the controller 150 can control the drive of the actuator 140, for example, in accordance with a detection result at the touch panel. The controller 150 can control the drive of the actuator 140 based on whether operations are performed at one or more among the operation positions A to D on the operation surface 130A.

Figure 2A:
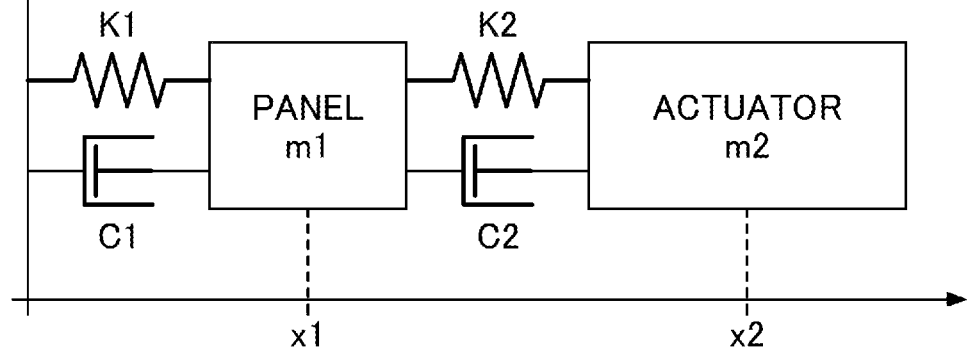
FIG. 2A is a diagram illustrating a simulation model in which a mechanical system configuration of the haptic output device is equivalently described with springs and dampers.

FIG. 2A is a diagram illustrating a simulation model in which a mechanical system configuration of the haptic output device 100 illustrated in FIG. 1 is equivalently described with springs and dampers.

In the simulation model illustrated in FIG. 2A, the panel is coupled to the securing member via a spring K1 and a damper C1, and the actuator is coupled to the panel via a spring K2 and a damper C2. The springs K1 and K2 have spring constants of K1 and K2, respectively. The dampers C1 and C2 have damping factors are C1 and C2, respectively. The panel and the actuator have masses of m1 and m2, respectively. The simulation model illustrated in FIG. 2A has two resonance frequencies. One is a resonance frequency of the first vibration system including the actuator and the panel, and another is a resonance frequency of the second vibration system including the panel and the securing member.

Figure 2B:
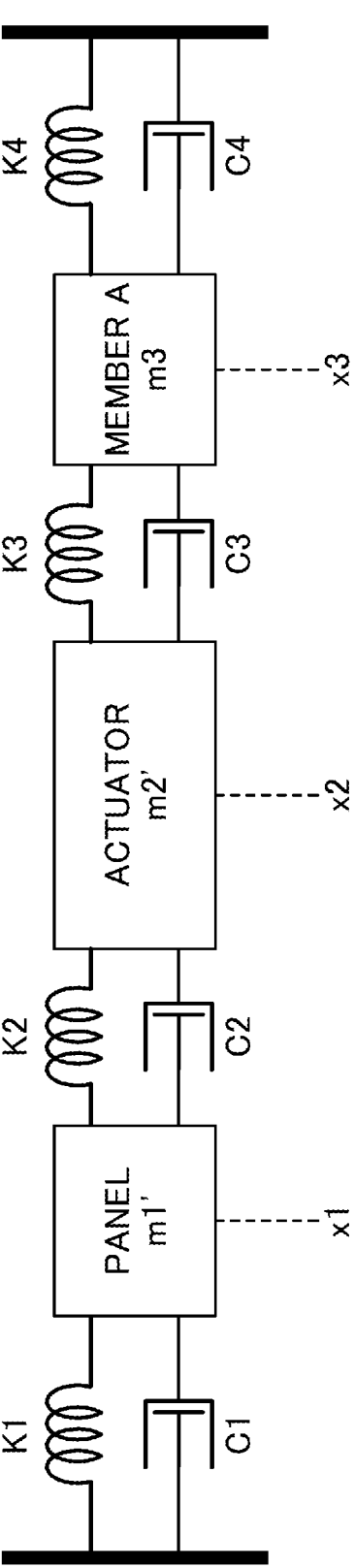
FIG. 2B is a diagram illustrating an actual configuration example in which the mechanical system of the haptic output device is equivalently described with the springs and the dampers.

FIG. 2B is a diagram illustrating an actual configuration example in which the mechanical system of the haptic output device 100 illustrated in FIG. 1 is equivalently described with the springs and the dampers. The actual configuration example illustrated in FIG. 2B is not simplified unlike the simulation model in FIG. 2A, and is illustrated more realistic than the simulation model. However, practically, the haptic output device 100 may have a more complicated configuration than the actual configuration example illustrated in FIG. 2B.

In the actual configuration example illustrated in FIG. 2B, the panel is coupled to the securing member via the spring K1 and the damper C1, and the actuator is coupled to the panel via the spring K2 and the damper C2. A member A is coupled, at one end, to the actuator via a spring K3 and a damper C3, and the other end of the member A is coupled to a securing member via a spring K4 and a damper C4. The springs K1 to K4 have spring constants of K1 to K4, respectively. The dampers C1 to C4 have damping rates of C1 to C4, respectively. In the configuration example illustrated in FIG. 2B, a vibration system that includes the springs K1 to K4, the dampers C1 to C4, the panel (mass of m1'), the actuator (mass of m2'), and the member A (mass of m3) causes a plurality of resonances, and thus vibrations occurring in the panel have three or more resonance frequencies. The haptic output device 100 can be described using a more complicated configuration example that has an increased number of resonance frequencies. Here, the member A is one of components of the haptic output device 100, and may be constituted by part of the securing member 110, the elastic member 120, the panel 130, or the actuator 140. In this case, any component of the haptic output device 100, other than the elastic member 120, may also have viscoelasticity.

<Frequency Characteristics with Respect To Gain and Phase in Ideal Haptic Output Device And Actual Haptic Output Device>

Figure 3:
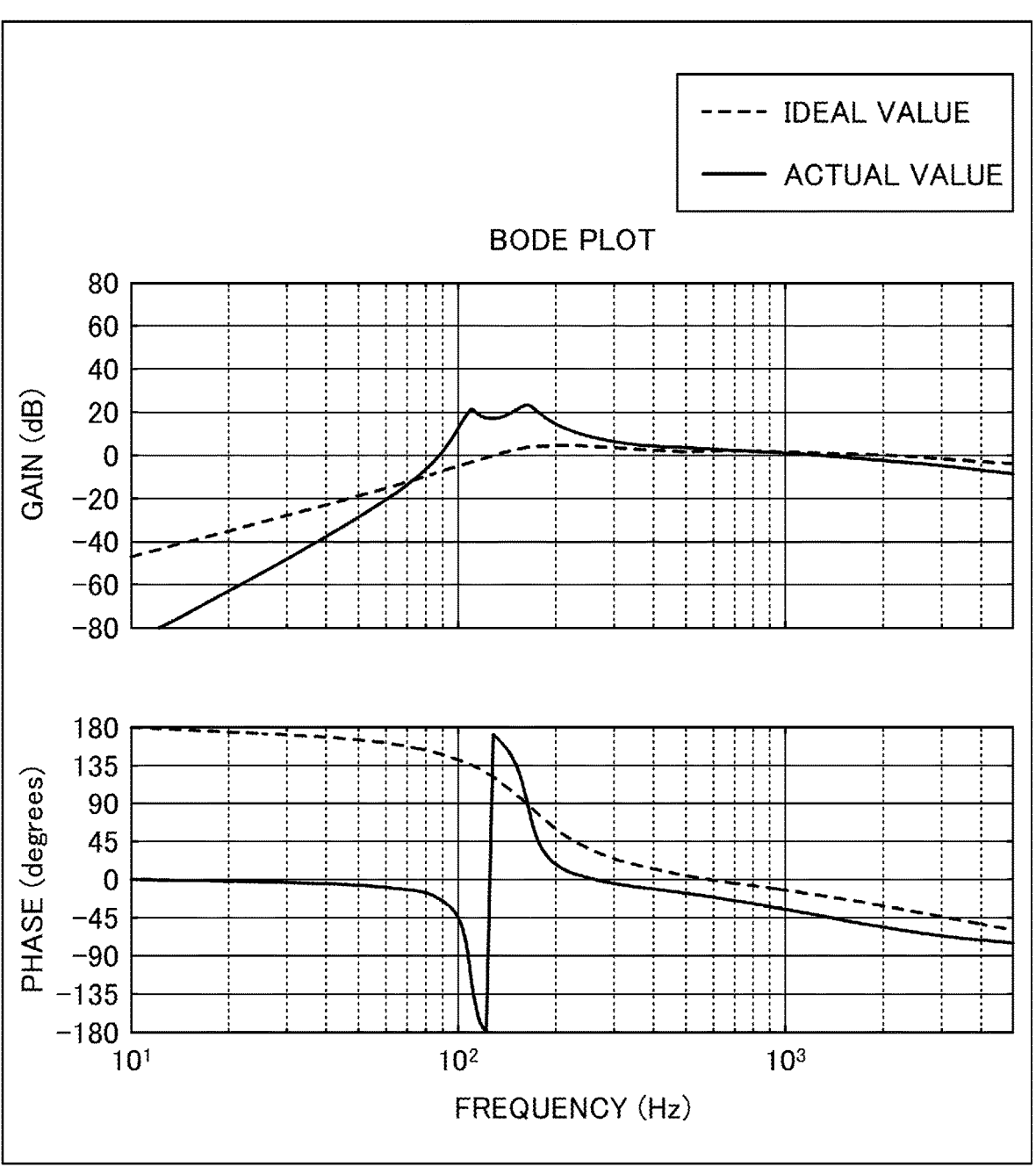
FIG. 3 is a diagram illustrating an example of frequency characteristics of an ideal haptic output device and an actual haptic output device, with respect to each of a gain and a phase.

FIG. 3 is a diagram illustrating an example of frequency characteristics in an ideal haptic output device and an actual haptic output device, with respect to each of a gain and a phase. The ideal haptic output device has an ideal characteristic illustrated in FIG. 3. In the following description, the simulation model illustrated in FIG. 2A is used to define the actual haptic output device unless otherwise specified. The upper part of FIG. 3 illustrates the frequency characteristics with respect to an acceleration gain, and the lower part of FIG. 3 illustrates the frequency characteristics with respect to the phase in the ideal haptic output device and the actual haptic output device. In FIG. 3, the characteristic of the ideal haptic output device is indicated by a broken line, and the characteristic of the actual haptic output device is indicated by a solid line. The characteristics of the actual haptic output device can be obtained using the simulation model illustrated in FIG. 2A. FIG. 3 illustrates the characteristics in a case where the drive signal applied to the actuator 140 is constant regardless of the frequency.

As indicated by the broken line on the upper part of FIG. 3, the acceleration of the ideal haptic output device has a characteristic that smoothly changes with a frequency change. In contrast, as indicated by the solid line on the upper part of FIG. 3, for the acceleration of the actual haptic output device, peaks are present at a plurality of (two in an example in FIG. 3) frequencies. That is, in the actual haptic output device, a plurality of resonance frequencies are present.

As indicated by the broken line on the lower side of FIG. 3, the phase of the ideal haptic output device has a characteristic that smoothly changes with the frequency change. In contrast, as indicated by the solid line on the lower side of FIG. 3, the phase of the actual haptic output device significantly changes at frequencies around a resonance frequency.

<Inverse Filter>

In order to correct the frequency characteristic with respect to the acceleration of the actual haptic output device to a frequency characteristic with respect to ideal acceleration, an inverse filter having an inverse of the frequency characteristic with respect to the acceleration of the actual haptic output device illustrated in FIG. 3 can be used. With this approach, the output of the inverse filter can have a flat characteristic. In addition, with use of the inverse filter having the inverse of the frequency characteristic with respect to the phase of the actual haptic output device as illustrated in FIG. 3, the output of the inverse filter can also have a flat characteristic with respect to the phase.

However, for the frequency characteristic with respect to the acceleration of the actual haptic output device illustrated in FIG. 3, a gain at a lower frequency side is very low. For this reason, the inverse characteristic requires an infinitely great gain at the lower frequency side. Thus, there lies a challenge to implement the inverse filter having the infinitely great gain at the lower frequency side.

<Transfer Function of Actual Haptic Output Device>

Figure 4:
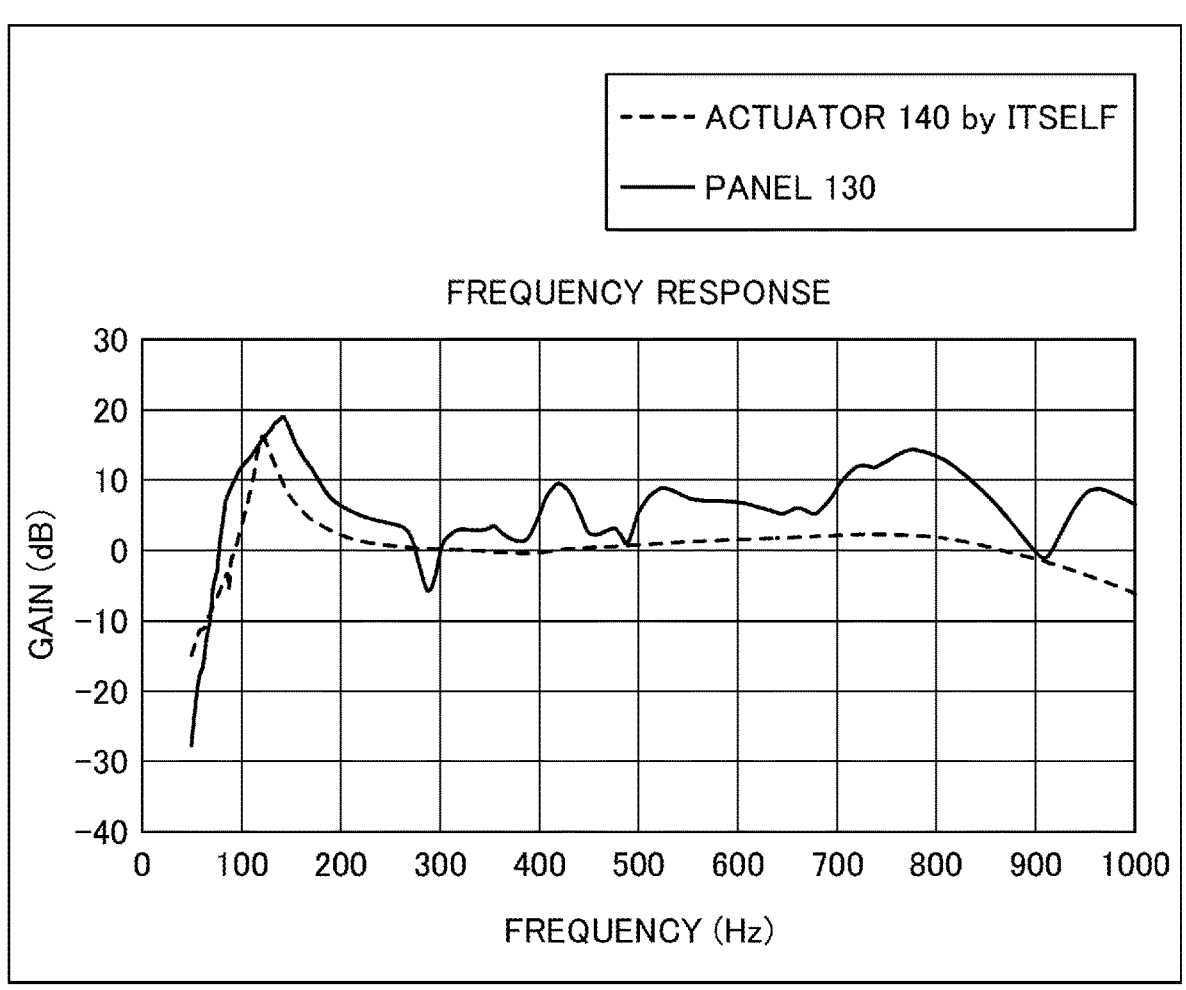
FIG. 4 is a diagram illustrating an example of the frequency characteristic with respect to vibratory acceleration of each of an actuator alone and the haptic output device.

FIG. 4 is a diagram illustrating an example of the frequency characteristic with respect to vibratory acceleration of the actuator 140 alone, as well as including the frequency characteristic with respect to the vibratory acceleration of the haptic output device 100. The haptic output device 100 has a more complicated mechanical system as illustrated in FIG. 2B, which is not the simulation model illustrated in FIG. 2A. In FIG. 4, the frequency characteristic with respect to the vibratory acceleration of the actuator 140 alone is indicated by the broken line, and the frequency characteristic with respect to the vibratory acceleration of the panel 130 of the haptic output device 100 is indicated by the solid line.

In the example illustrated in FIG. 4, the vibratory acceleration of the actuator 140 alone has a characteristic in which a peak is present at a resonance frequency of about 120 Hz, and in which the acceleration smoothly decreases at frequencies that are lower and higher than the resonance frequency. In contrast, as illustrated in FIG. 4, the panel 130 may actually have resonance frequencies, and the vibratory acceleration of the panel 130 in the haptic output device 100 has a complicated characteristic in which peaks are present at ten or more resonance frequencies.

A transfer function that is obtained from such a haptic output device 100 is expressed, for example, by Equation (1) below, where a drive signal applied to the actuator 140 is input to the transfer function, and the vibration of the panel 130 is output from the transfer function. In Equation (1), in each of a denominator and a numerator, a function is expressed by multiplying a plurality of terms.

[Math. 1]

$$\frac{\cdots(s+a1)(s+a2)(s-a3)\cdots}{\cdots(s+b1)(s+b2)(s+b3)\cdots} \qquad (1)$$

Figure 5:
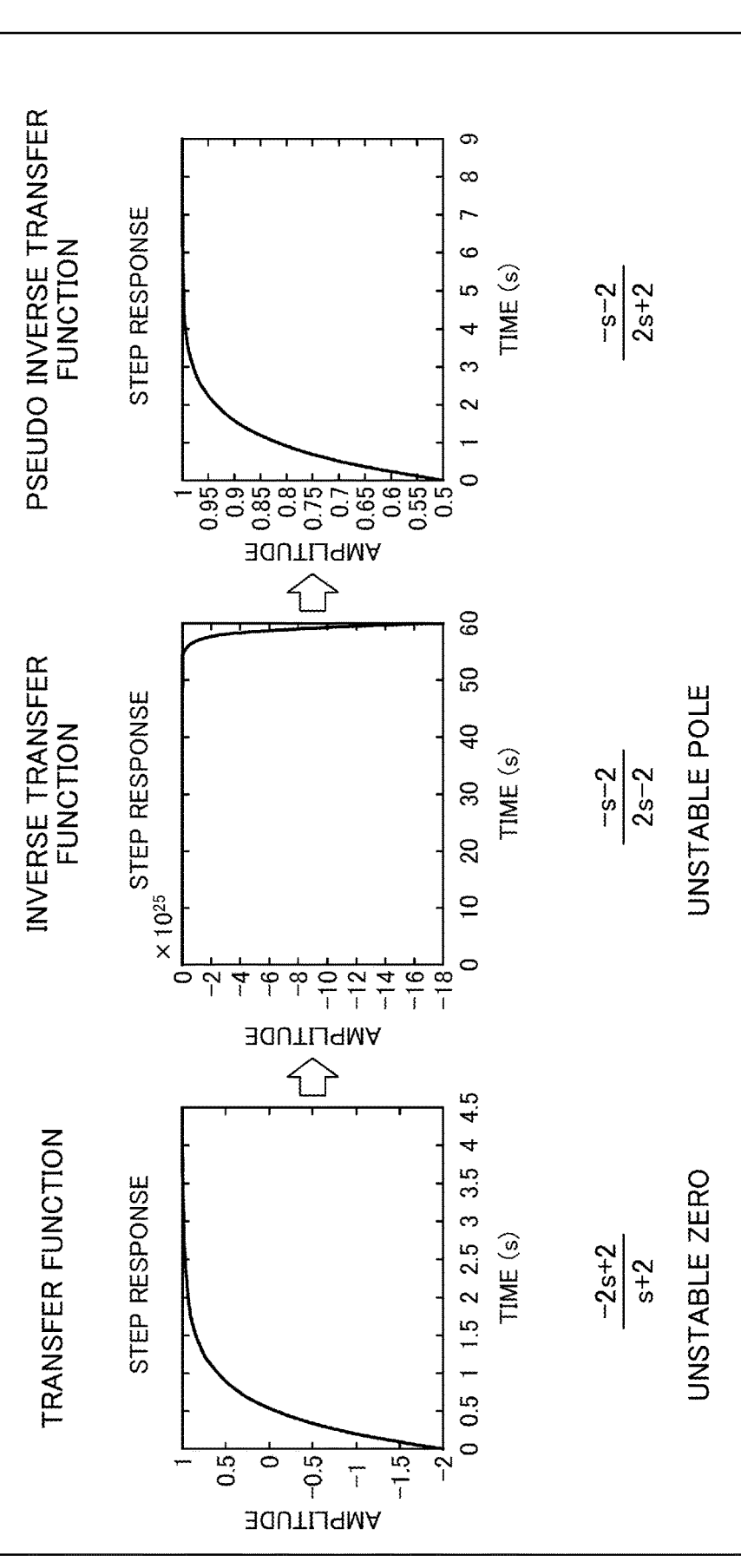
FIG. 5 is a diagram for describing a method for configuring a pseudo inverse transfer function.

Here, when an inverse transfer function is derived from a generalized transfer function as expressed in Equation (1), in a case where a transfer function as illustrated in FIG. 5 is assumed to be used, s in the term of (s−a3) in the numerator in Equation (1) is given by s=a3 (a3>0) to make the term zero. In this case, the transfer function has an unstable zero. If an inverse filter is obtained from such a transfer function having the above unstable zero, the term (s−a3) is present in a denominator of the inverse filter, and thus the inverse filter has an unstable pole. A system having the unstable pole oscillates, and thus it is difficult to stably and smoothly drive the actuator 140.

Therefore, in order to provide an ideal response characteristic, the haptic output device 100 according to the embodiment uses a pseudo inverse filter (hereinafter referred to as the "pseudo inverse filter") that is obtained by modifying the inverse filter. The pseudo inverse filter is an example of a correction model that corrects the drive signal that is applied to the actuator 140.

Pseudo Inverse Filter

FIG. 5 illustrates a method for configuring a pseudo inverse transfer function. The left side of FIG. 5 illustrates (i) a minimal realization of transfer function having an unstable zero and a stable pole for the haptic output device 100 and (ii) a temporal change characteristic of the transfer function. Such a transfer function has the unstable zero. This is because $(-2s+2)$ expressing the numerator of the transfer function becomes zero when s is 1.

The middle part of FIG. 5 illustrates (i) an inverse transfer function for the haptic output device 100 and (ii) a temporal change characteristic of the inverse transfer function. The inverse transfer function is an inverse of the transfer function for the haptic output device 100 as illustrated on the left side of FIG. 5. Thus, the inverse transfer function is expressed by $(-s-2)/(2s-2)$. Such an invert transfer function has an unstable pole. This is because $(2s-2)$ in the denominator becomes zero when s is 1. When the inverse transfer function having the unstable pole is used, oscillation occurs. Thus, it is difficult to stably and smoothly drive the actuator 140.

The right side of FIG. 5 illustrates (i) a pseudo inverse transfer function that is used as a base of the pseudo inverse filter of the haptic output device 100 and (ii) a temporal change characteristic of the pseudo inverse transfer function. The pseudo inverse transfer function has a configuration in which a positive or negative sign of a real part in the denominator of the inverse transfer function as illustrated on the middle part of FIG. 5 is inverted. Thus, the pseudo inverse transfer function is expressed by $(-s-2)/(2s+2)$. Such a pseudo inverse transfer function has a stable pole. This is because $(2s+2)$ in denominator of the pseudo inverse transfer function becomes zero when s is $-1$.

The pseudo inverse filter of the haptic output device 100 is created using the method for configuring a pseudo inverse transfer function. That is, the pseudo inverse filter of the haptic output device 100 is a model based on the pseudo inverse transfer function in which an unstable pole included in the inverse transfer function is changed to a stable pole.

The pseudo inverse filter of the haptic output device 100 may be a model based on an inverse of the pseudo transfer function in which an unstable zero included in the transfer function is changed to a stable zero. In this case, the stable zero may be obtained by inverting a positive or negative sign of a real part related to an unstable zero.

The pseudo inverse filter obtained in the above manner is a correction model that reduces the effect of resonance frequencies on a response characteristic.

Figure 6:
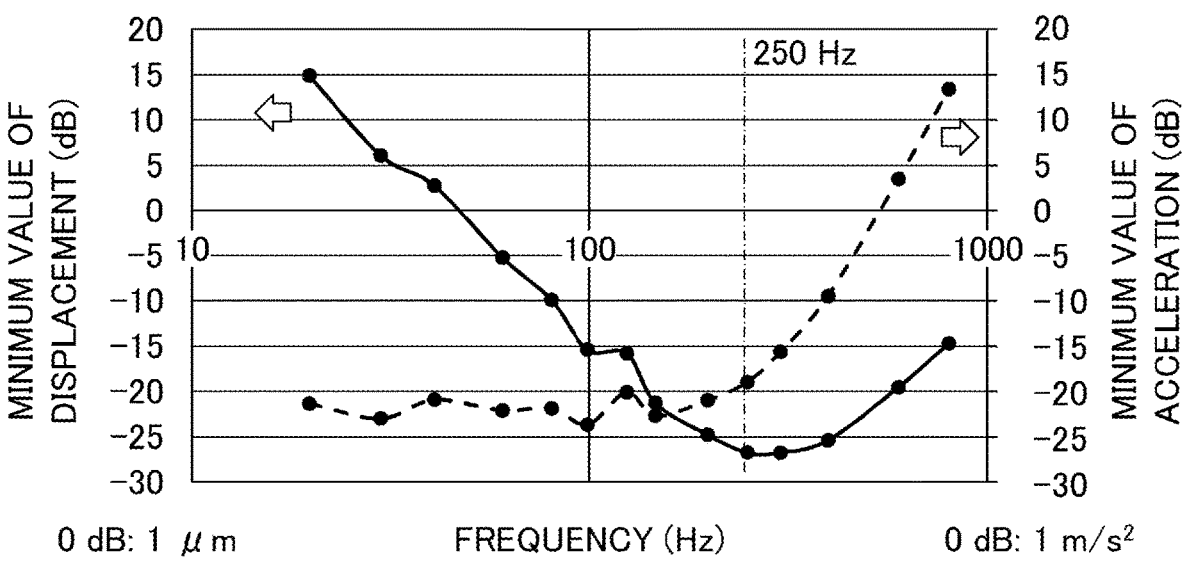
FIG. 6 is a diagram illustrating the frequency characteristic (solid line) with respect to a minimum value of displacement that can be detected using a Pacinian corpuscle in the skin of a human hand, as well as including the frequency characteristic (broken line) with respect to the minimum value of acceleration that can be detected using the Pacinian corpuscle.

FIG. 6 is a diagram illustrating (i) a frequency characteristic (solid line) with respect to a minimum value of displacement that can be detected using a Pacinian corpuscle in the skin of a human hand and (ii) a frequency characteristic (broken line) with respect to a minimum value of acceleration that can be detected using the Pacinian corpuscle.

The displacement detected using the Pacinian corpuscle refers to displacement of an object that is touched with the hand. Thus, the frequency characteristic (solid line) with respect to the minimum value of the displacement detected using the Pacinian corpuscle means a sense of vibration that can be sensed by the Pacinian corpuscle. As seen from the characteristic indicated by the solid line in FIG. 6, a lower limit on the frequency with respect to the displacement detected using the Pacinian corpuscle is 30 Hz or lower. In addition, At the frequency of 250 Hz at which the displacement is detected using the Pacinian corpuscle, the lowest sensitivity is obtained. A vibration sensing band covers the highest frequency of about 1 kHz.

The frequency characteristic with respect to the acceleration as indicated by the broken line is a characteristic that is derived from the frequency characteristic with respect to the displacement as indicated by the solid line. The acceleration detected using the Pacinian corpuscle is derived from vibration of the object that is touched with the hand. As illustrated in FIG. 6, at frequencies of 250 Hz or lower, the minimum acceleration required to respond to the vibration has an approximately constant value. From such a characteristic, it is known that the Pacinian corpuscle provides a sensitive characteristic with respect to the acceleration. In contrast, at frequencies of higher than 250 Hz, the acceleration required is increased rapidly. When the frequency of 100 Hz is used as a reference, the acceleration required at 600 Hz is about 20 times the acceleration required at 100 Hz. Also, the acceleration at 800 Hz is about 70 times the acceleration at 100 Hz. In view of the situation described above, a standard of an upper limit in an effective sensitive band range of vibrations is from 500 Hz to 700 Hz.

At frequencies of 100 Hz or lower, it is understood that the Pacinian corpuscle effectively acts, as a sense of vibration, at frequencies in the range of 100 Hz to 700 Hz, approximately, in order to activate any other sensory receptor. For this reason, in order to reserve a vibration band from 100 Hz to 500 Hz that is effective for the sense of vibration, frequencies of 30 Hz or lower are blocked, and frequencies of 700 Hz or higher are blocked, for example.

<Configuration of Haptic Output Device 100>

Figure 7:
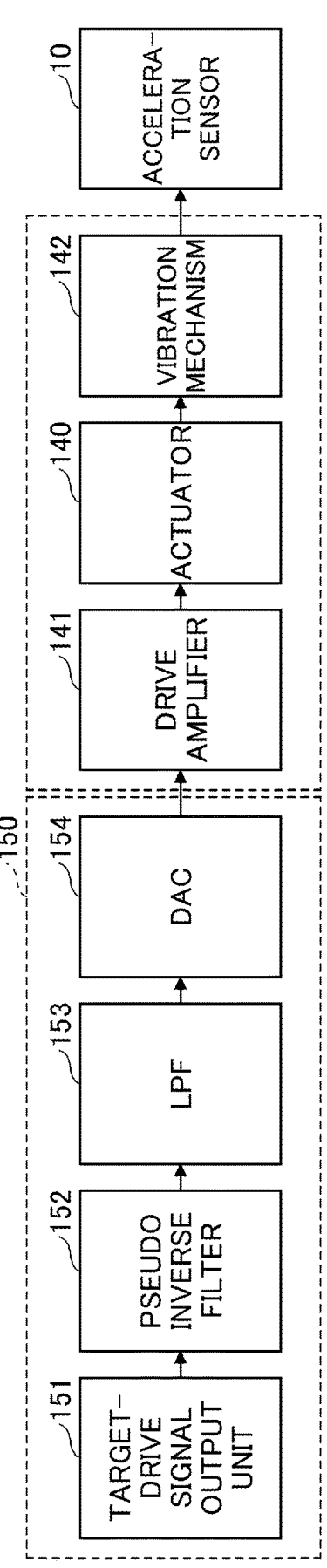
FIG. 7 is a block diagram illustrating a configuration example of the haptic output device.

FIG. 7 is a block diagram illustrating a configuration example of the haptic output device 100. As illustrated in FIG. 7, the controller 150 includes a target-drive signal output unit 151, a pseudo inverse filter 152, a low pass filter (LPF) 153, and a digital-to-analog converter (DAC) 154.

The target-drive signal output unit 151 retrieves a target drive signal from a memory to output the target drive signal. The target drive signal is a signal having a target value of the drive signal, which the controller 150 outputs to the actuator 140 when driving the actuator 140.

The pseudo inverse filter 152 is a pseudo inverse filter based on a pseudo inverse transfer function in which a positive or negative sign of a real part in the denominator of the inverse transfer function is inverted as described using FIG. 5. The pseudo inverse filter 152 has a stable pole. The pseudo inverse filter 152 incorporates a high pass filter (HPF), and corrects the gain with a pseudo inverse filter characteristic. The pseudo inverse filter 152 also cuts off components at a lower frequency side with respect to the gain, by using the HPF. A cutoff frequency of the HPF included in the pseudo inverse filter 152 is an example of a first frequency.

The cutoff frequency of the HPF included in the pseudo inverse filter 152 is preferably set to a frequency in the range of 20 Hz to 100 Hz, for example. In this description, for example, the cutoff frequency is 30 Hz. In addition, an upper limit on the gain at the cutoff frequency or lower of the HPF of the pseudo inverse filter 152 is greater than or equal to 20 dB and less than or equal to 30 dB. With this arrangement, the gain at a lower frequency side can be reliably reduced.

The LPF 153 is provided to cut off a higher frequency component of a signal that passes through the pseudo inverse filter 152. The cutoff frequency of the LPF 153 is an example of a second frequency. For example, preferably, the cutoff frequency of the LPF 153 is 500 Hz or higher. In this description, for example, the cutoff frequency is 700 Hz.

The vibration occurring on the operation surface 130A through the haptic output device 100 is mainly sensed by the Pacinian corpuscle in the skin of a human hand. An upper limit on the frequencies at which the Pacinian corpuscle can act is approximately from 500 Hz to 1 kHz. For this reason, the LPF 153 is provided to cut off higher frequency components of the drive signal at which the Pacinian corpuscle cannot act.

The DAC 154 is provided on an output side of the LPF 153. The DAC 154 converts the drive signal that passes through the LPF 153, into an analog signal, and then outputs the analog signal to the drive amplifier 141. As a result, the actuator 140 is driven by the drive signal that is supplied via the drive amplifier 141, and then the vibration mechanism 142 that includes the panel 130 vibrates. FIG. 7 illustrates an acceleration sensor 10 for detecting the vibration in the vibration mechanism 142.

The present embodiment is described using the configuration in which the pseudo inverse filter 152 includes a HPF and the LPF 153 is located after the pseudo inverse filter 152. However, the pseudo inverse filter 152 may include a LPF corresponding to the LPF 153, in addition to including the HPF. Further, the HPF may be provided outside the pseudo inverse filter 152 (before or after the pseudo inverse filter 152). Further, the LPF 153 may be located before the pseudo inverse filter 152.

Without incorporating the HPF in the pseudo inverse filter 152, the pseudo inverse filter characteristic of the pseudo inverse filter 152 may have a cutoff characteristic of a lower frequency component, as in the HPF. That is, the pseudo inverse filter 152 may be a correction model that is restricted by a high pass filter that sets an upper limit on the gain at frequencies of the first frequency or lower.

The pseudo inverse filter characteristic of the pseudo inverse filter 152 may have a cutoff function of a higher frequency component, as in the LPF. That is, the pseudo inverse filter 152 may be a correction model that is restricted by a low pass filter that sets the second frequency as a given cutoff frequency.

When receiving the target drive signal, a given input signal is generated to be output to the DAC 154. However, by preliminarily performing an operation through a computer or the like, the given input signal may be stored in a memory or the like, without performing the operation on the given input signal at a timing at which the target drive signal is input. In this case, without including the target-drive signal output unit 151, the pseudo inverse filter 152, and the LPF 153, the controller 150 may include the memory that stores the given input signal that is obtained by preliminarily performing the operation as described above, instead of using the target-drive signal output unit 151, the pseudo inverse filter 152, and the LPF 153. With this approach, the controller 150 may retrieve the given input signal from the memory to output the given input signal to the DAC 154. Even in such a case, the same effect as described in the case where the controller 150 includes the target-drive signal output unit 151, the pseudo inverse filter 152, and the LPF 153 can be obtained.

<Pseudo Inverse Filter Characteristic of Pseudo Inverse Filter 152>

Figure 8A:
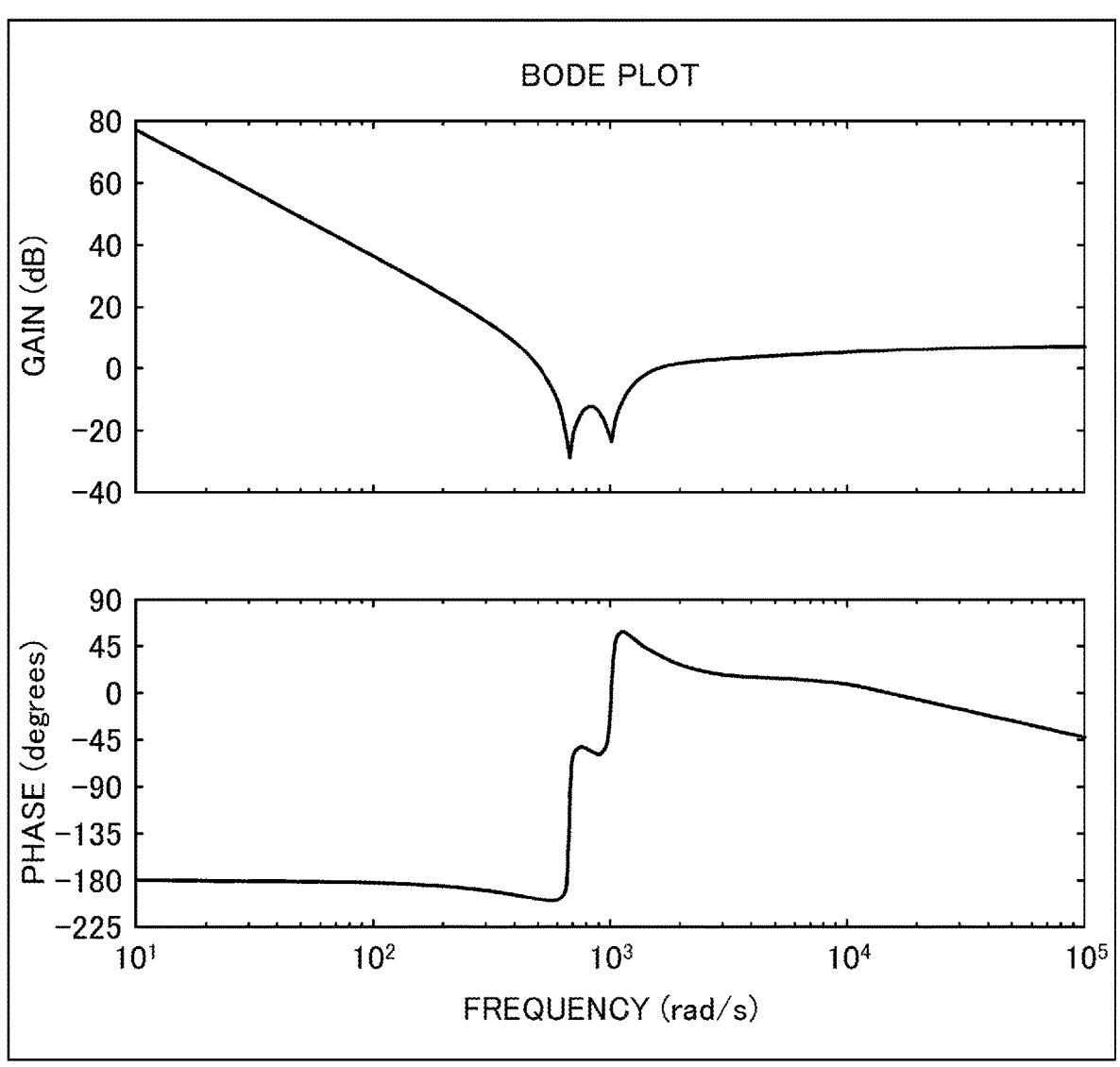
FIG. 8A is a diagram illustrating an example of pseudo inverse filter characteristics that are obtained from the pseudo inverse transfer function of the haptic output device.
Figure 8B:
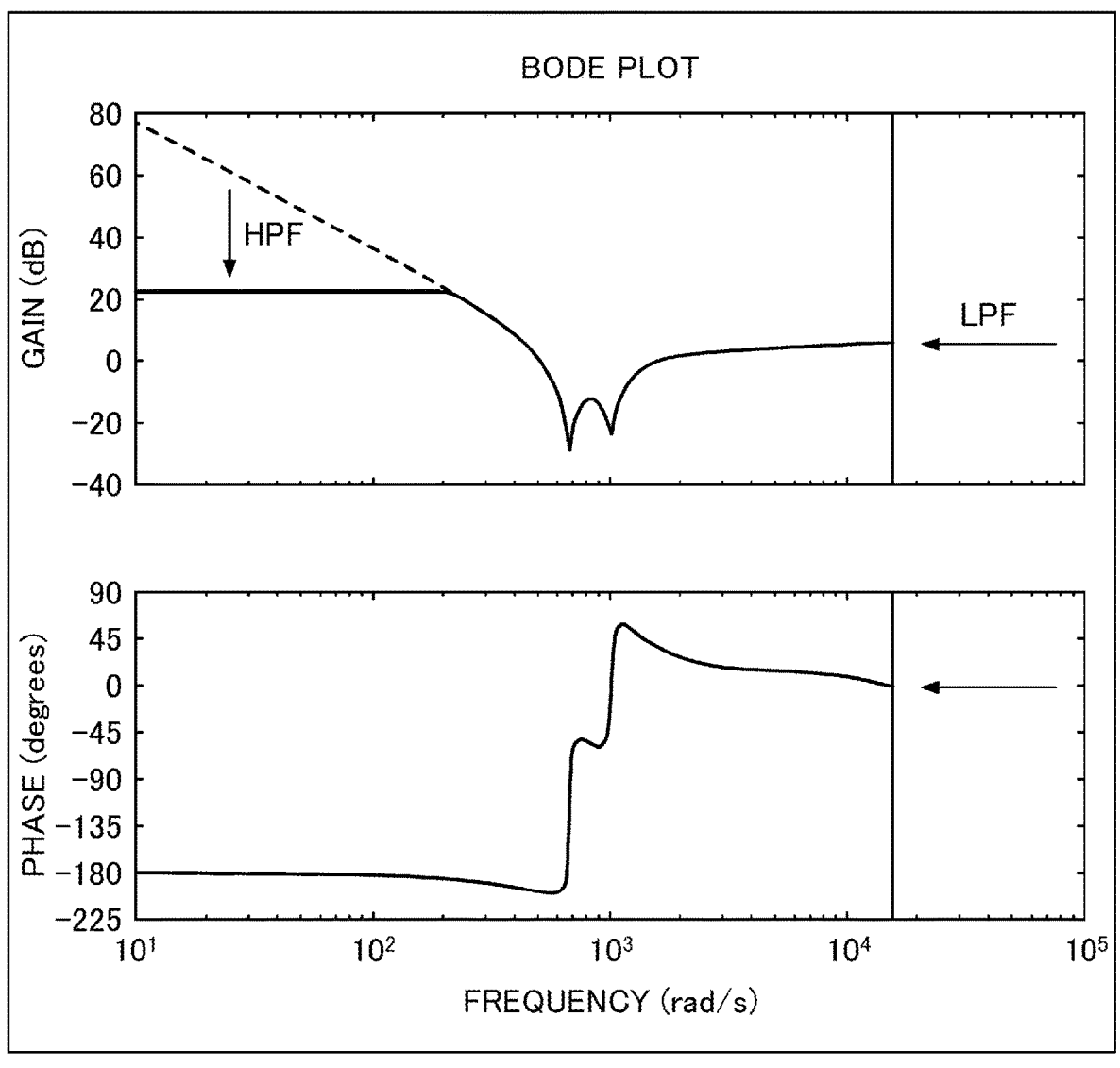
FIG. 8B is a diagram illustrating an example of pseudo inverse filter characteristics of a pseudo inverse filter.

FIG. 8A is a diagram illustrating an example of the pseudo inverse filter characteristic that is obtained from the pseudo inverse transfer function of the haptic output device 100. FIG. 8B is a diagram illustrating an example of the pseudo inverse filter characteristic of the pseudo inverse filter 152.

By performing the process described in FIG. 5, the inverse transfer function is obtained from the transfer function of the haptic output device 100, and further by changing a sign in the inverse transfer function to eliminate an unstable pole, the pseudo inverse transfer function can be obtained. The pseudo inverse filter characteristic of the haptic output device 100 illustrated in FIG. 8A is derived from the pseudo inverse transfer function obtained above. The process to change a given sign to eliminate any unstable pole is, for example, a process to invert a sign of a real part of a denominator of the inverse transfer function, as in the case where a positive or negative sign of the real part in the denominator of the pseudo inverse transfer function on the middle part of FIG. 5 is inverted to express the same denominator as that of the pseudo inverse transfer function on the right side of FIG. 5.

The pseudo inverse filter characteristic of the pseudo inverse filter 152 illustrated in FIG. 8B is obtained by controlling or the like the gain of the pseudo inverse transfer function illustrated in FIG. 8A. Specifically, the gain at a lower frequency side is suppressed by the HPF, and a higher frequency component is blocked by the LPF.

Each of the operation positions A to D on the operation surface 130A of the panel 130 illustrated in FIG. 1 has a different positional relationship with the actuator 140, the securing member 110, and the elastic member 120. With this arrangement, vibration characteristics of the panel 130 at any operation position, among the operation positions A to D, may differ significantly to the extent that the difference between given vibration characteristics cannot be negligible. A case where the vibration characteristics differ to the extent that the difference between the given vibration characteristics cannot be negligible means the extent to which a user can perceive a difference between haptic feedbacks that are provided at the operation positions A to D, for example, due to a difference between gains that are obtained by the pseudo inverse filter characteristics illustrated in FIG. 8A and FIG. 8B.

In such a case, the controller 150 may include a plurality of pseudo inverse filters 152 that correspond to the respective operation positions A to D, and may select and use a given pseudo inverse filter 152 corresponding to a given operation position among the plurality of operation positions A to D, where operations are performed at the given operation position, based on the output of a touch panel of the panel 130.

<Temporal Change in Acceleration of Panel 130>

Figure 9:
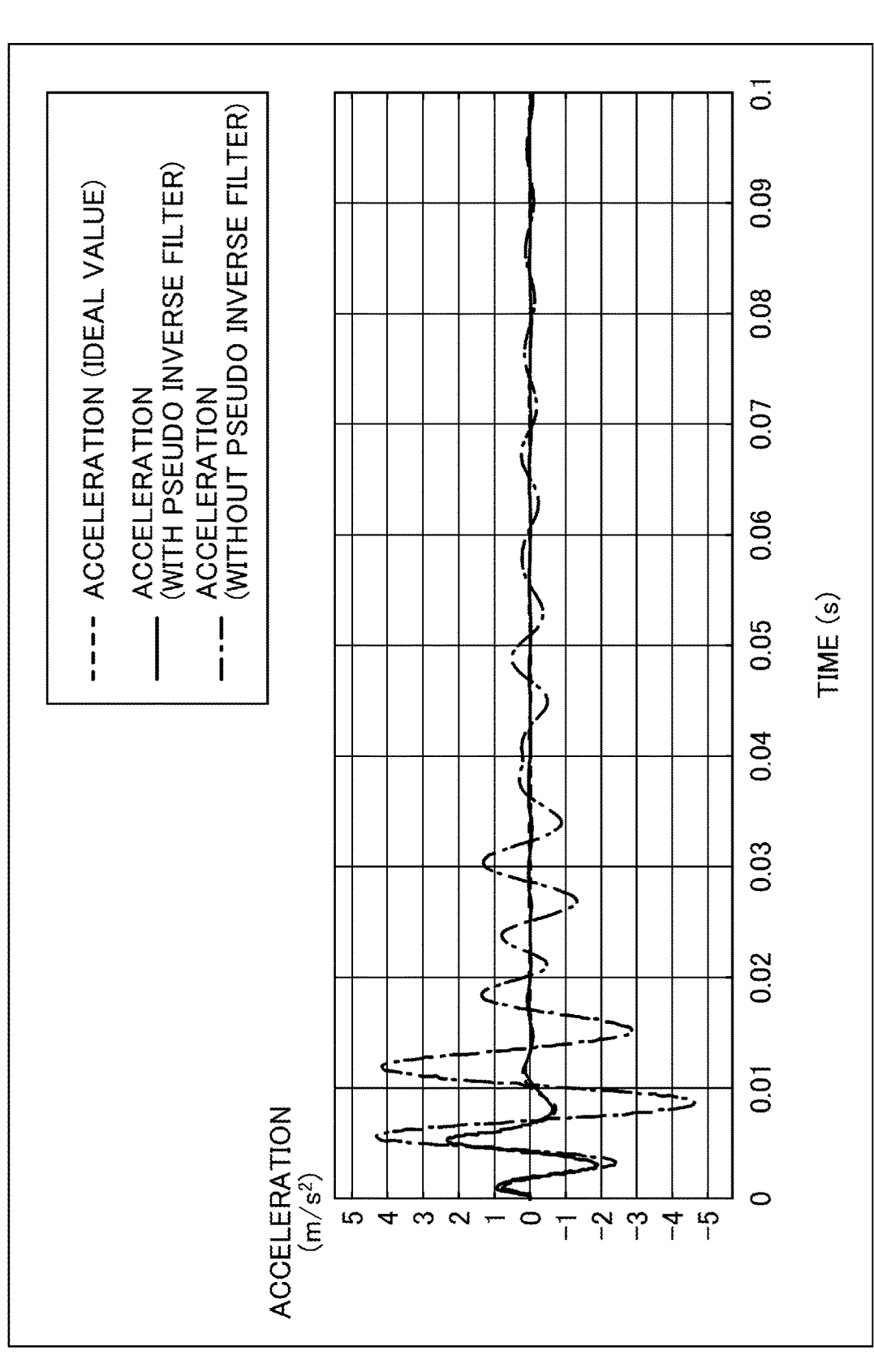
FIG. 9 is a diagram illustrating an example of vibration of a panel that occurs immediately after the actuator of the haptic output device vibrates.

FIG. 9 is a diagram illustrating an example of the vibration of the panel 130 that occurs immediately after the actuator 140 of the haptic output device 100 vibrates. In FIG. 9, the horizontal axis represents the time (seconds), and the vertical axis represents the vibratory acceleration (m/s²).

In FIG. 9, a first temporal change in the acceleration of the panel 130 is indicated by a solid line. Also, in FIG. 9, for comparison, a second temporal change in the acceleration of the panel in an ideal haptic output device is indicated by a broken line, and a third temporal change in the acceleration of the panel 130 in a case where the pseudo inverse filter 152 is not used is indicated by a one-dot chain line. The actuator 140 starts driving at time 0 (seconds).

The first temporal change in the acceleration of the panel 130 of the haptic output device 100 as indicated by the solid line approximately coincides with the second temporal change in the acceleration of the panel in the ideal haptic output device as indicated by the broken line, and the vibration dissipates in about 0.015 seconds immediately after the actuator 140 starts driving. In addition, for the third temporal change in the acceleration of the panel 130 in the case where the pseudo inverse filter 152 is not used as indicated by the one-dot chain line, a greater amplitude is obtained, compared to the acceleration of the panel 130 of the haptic output device 100 as indicated by the solid line. Also, in this case, the vibration does not dissipate even after about 0.1 seconds elapses.

As described above, it is confirmed that, with use of the pseudo inverse filter 152, the haptic output device 100 can provide an excellent vibration characteristic similar to that of the ideal haptic output device.

<Gain and Phase>

Figure 10:
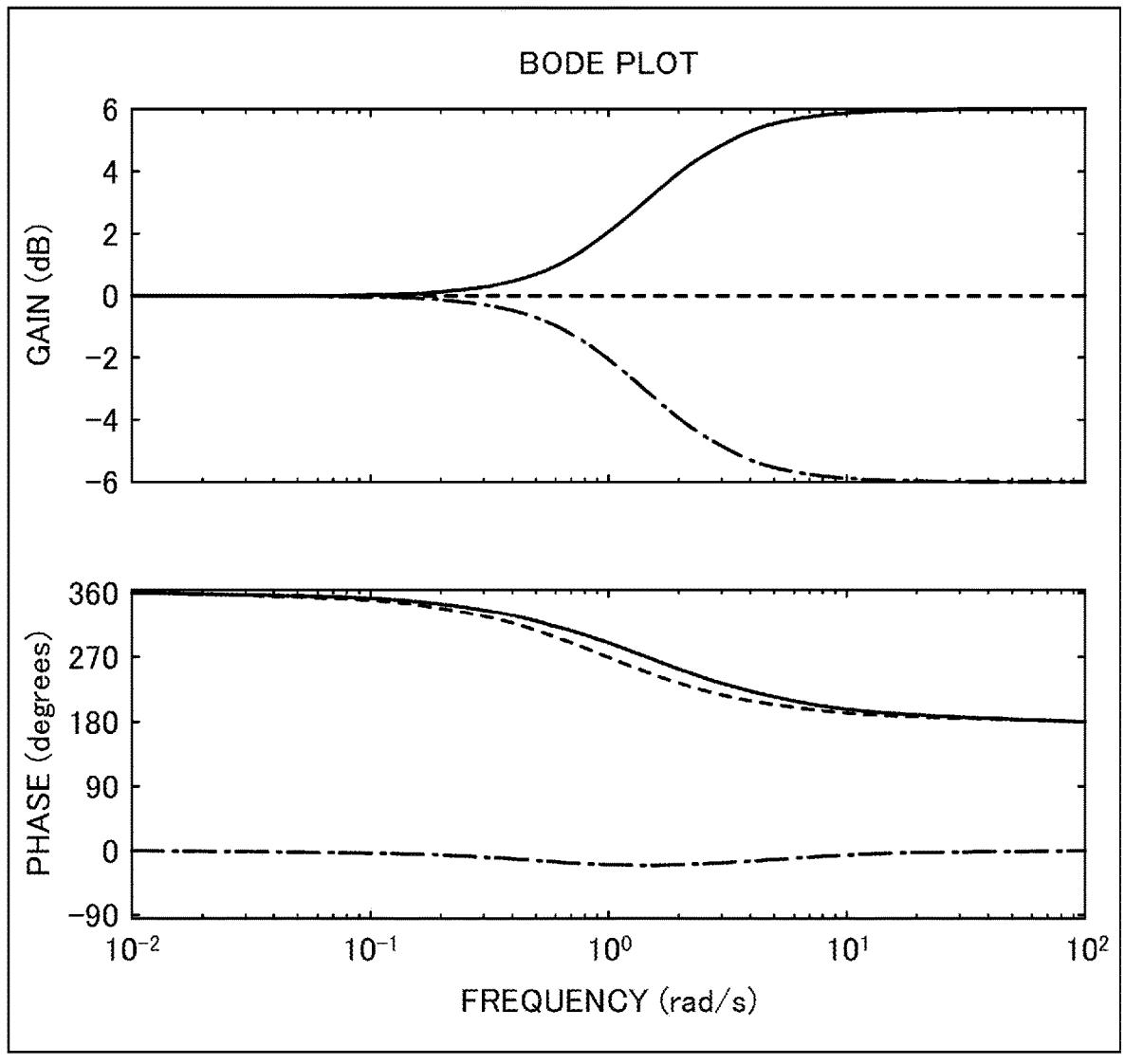
FIG. 10 is a diagram illustrating an example of the gain and the phase of a stabilized system.

FIG. 10 is a diagram illustrating an example of the gain and the phase of a stabilized system. The upper part of FIG. 10A illustrates the frequency characteristic with respect to the gain, and the lower part of FIG. 10 illustrates the frequency characteristic with respect to the phase. The frequency characteristic with respect to the gain of the stabilized system is indicated by a solid line, the frequency characteristic with respect to the gain of the pseudo inverse filter 152 is indicated by a one-dot chain line, and the frequency characteristic with respect to the gain for the output of a system in which the pseudo inverse filter 152 and the stabilized system are coupled in series is indicated by a broken line.

As illustrated in the upper part of FIG. 10, the output of the system in which the pseudo inverse filter 152 indicated by the broken line and the stabilized system are coupled in series is constant at 0 dB from a lower frequency side to a higher frequency side. This is because the resulting frequency characteristic is obtained by multiplying the frequency characteristic of the stabilized system as indicated by the solid line, by the pseudo inverse filter characteristic of the pseudo inverse filter 152 as indicated by the one-dot chain line. The pseudo inverse filter characteristic of the pseudo inverse filter 152 as indicated by the one-dot chain line is an inverse of the frequency characteristic of the stabilized system as indicated by the solid line, and as a result, a gain of the output (broken line) of the system in which the stabilized system and the pseudo inverse filter 152 are coupled in series becomes constant.

On the lower part of FIG. 10, the frequency characteristic with respect to the phase of the stabilized system is indicated by the solid line, a pseudo inverse filter characteristic with respect to the phase of the pseudo inverse filter 152 is indicated by the one-dot chain line, and the frequency characteristic with respect to the phase of the stabilized system in which an unstable zero is stabilized is indicated by the broken line. On the lower part of FIG. 10, a phase characteristic of the system in which the stabilized system and the pseudo inverse filter 152 are coupled in series is indicated by the one-dot chain line. From the lower part of FIG. 10, it is confirmed that even if the pseudo inverse filter is used, the phase does not change significantly, and that all phases are stable. In this example, the pseudo inverse filter that stabilizes an unstable zero is used, but the phase slightly changes as indicated by the one-dot chain line. In order to stabilize the phase by reducing the change in the phase, optimization may be performed using non-linear optimization or the like, in view of the configuration of the pseudo inverse filter.

<Effect>

The haptic output device 100 includes the actuator 140 to vibrate in accordance with an input signal, the panel 130 coupled to the actuator 140 and configured to be excited in response to the vibration of the actuator 140, and the controller 150 to control the drive of the actuator 140. A vibration system that includes the actuator 140 and the panel 130 has resonance frequencies. The controller 150 corrects an input drive signal, using a correction model (pseudo inverse filter 152) that is preliminarily generated based on the resonance frequencies, to output the corrected input drive signal to the actuator 140 as the input signal. Alternatively, the controller 150 outputs a signal to the actuator 140 as the input signal, the signal being preliminarily generated using the correction model (pseudo inverse filter 152). With this arrangement, the drive signal that is applied to the actuator 140 is corrected by the correction model that is preliminarily generated based on the resonance frequencies.

With this arrangement, when the vibration system including the actuator 140 has resonance frequencies, the haptic output device 100 capable of providing a good haptic feedback can be provided. Also, the pseudo inverse filter 152 is a correction model that is preliminarily generated based on the resonance frequencies, and the correction model need not to be generated by a feedback control. As a result, the haptic output device 100 having excellent responsiveness can be provided.

A correction model is a model based on an inverse of a transfer function to which an input signal is input and from which a response characteristic of the panel 130 is output. With this arrangement, the correction model based on the inverse of the transfer function that outputs the vibration of the panel 130, in accordance with an input of the actuator 140 is used to appropriately correct a gain of the vibration system having the resonance frequencies.

A correction model includes (i) a model based on a pseudo inverse transfer function in which an unstable pole included in an inverse transfer function is changed to a stable pole or (ii) a model based on an inverse of the pseudo transfer function in which an unstable zero included in a transfer function is changed a stable zero. With this arrangement, oscillation in a system can be suppressed, and a stable gain with respect to a frequency change can be obtained. Thus, the haptic output device 100 capable of providing a good haptic feedback can be provided.

A stable pole is obtained by inverting a positive or negative sign of a real part related to an unstable pole. The stable zero is obtained by inverting the positive or negative sign of the real part related to an unstable zero. With this arrangement, oscillation in a system (for example, a vibration system of the entire haptic output device 100) can be suppressed, and a stable gain with respect to a frequency change can be obtained. Thus, the haptic output device 100 capable of providing a good haptic feedback can be provided.

The pseudo inverse filter 152 is a correction model that reduces the effect of resonance frequencies on a response characteristic. With this arrangement, the actuator 140 can be smoothly driven, thereby providing the haptic output device 100 capable of providing a better haptic feedback.

The pseudo inverse filter 152 includes (i) a correction model that includes a high pass filter that sets an upper limit on a gain with respect to a frequency that is lower than or equal to a first frequency or (ii) a correction model that is restricted by the high pass filter that sets the upper limit on the gain with respect to the frequency that is lower than or equal to the first frequency. With this arrangement, a portion in which a gain infinitely increases at a lower frequency side of the pseudo inverse filter characteristic can be cut off. Thus, the pseudo inverse filter 152 can be easily implemented.

A cutoff frequency of a HPF is higher than or equal to 30 Hz and lower than or equal to 100 Hz. With this arrangement, a portion in which a gain infinitely increases at a lower frequency side of higher than or equal to 30 Hz and lower than and equal to 100 Hz can be cut off. Thus, the pseudo inverse filter 152 can be easily implemented.

An upper limit on a gain is less than or equal to 20 dB and greater than or equal to 30 dB. With this arrangement, the gain at the lower frequency side can be reliably reduced.

The correction model includes (i) a low pass filter of which a cutoff frequency is a second frequency or (ii) a correction model that is restricted by the low pass filter of which the cutoff frequency is the second frequency. With this arrangement, at a higher frequency side of a pseudo inverse filter characteristic, a gain with respect to a high frequency component that cannot be detected using the Pacinian corpuscle of a human body can be reduced. Thus, the pseudo inverse filter 152 can be implemented more easily.

A second frequency is lower than or equal to 500 Hz and higher than or equal to 1 kHz. In this case, a gain with respect to higher frequency components that cannot be detected using the Pacinian corpuscle of a human body can be effectively reduced.

The securing member 110 that is coupled to the panel 130 is further provided, and resonance frequencies include a resonance frequency of a first vibration system that includes the actuator 140 and the panel 130, and include a resonance frequency of a second vibration system that includes the panel 130 and the securing member 110. In such a vibration system of the entire haptic output device 100 that has the resonance frequency of the first vibration system and the resonance frequency of the second vibration system, the haptic output device 100 capable of providing a good haptic feedback can be provided.

The panel 130 includes the operation surface 130A having a plurality of operation positions A to D, and the controller 150 includes a plurality of correction models corresponding the operation positions A to D. The controller 150 selects and uses a given correction model based on a corresponding operation position at which an operation is performed, among the plurality of operation positions. With this arrangement, the haptic output device 100 capable of providing a good haptic feedback that is obtained in accordance with a corresponding position among the plurality of operation positions A to D.

<Changes in Characteristic in Accordance with Q Value>

Figure 11A:
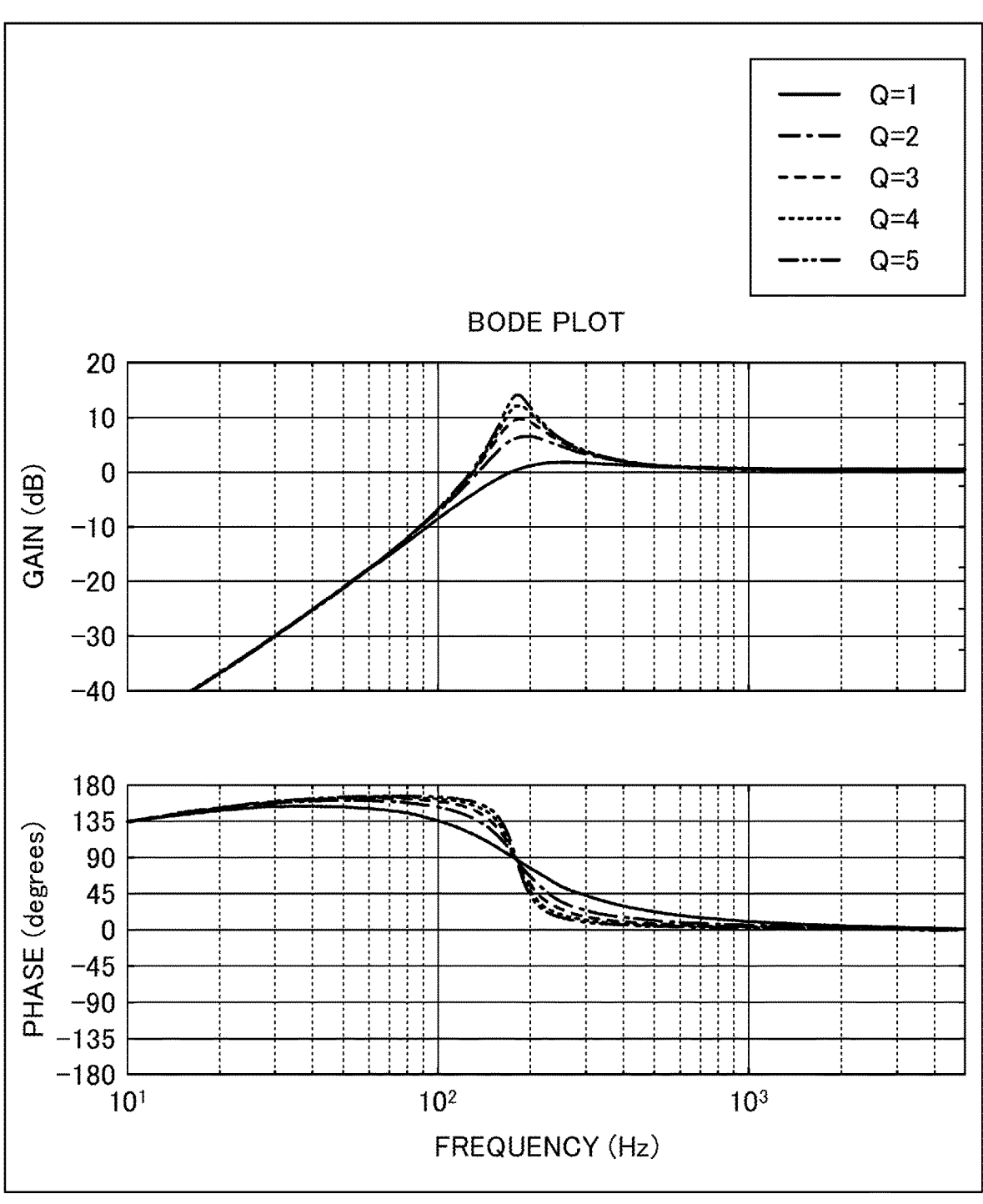
FIG. 11A is a diagram illustrating the frequency characteristics with respect to the gain and the phase of the output of the ideal haptic output device.

FIG. 11A is a diagram illustrating the frequency characteristic with respect to each of the gain and the phase for the output of the ideal haptic output device illustrated in FIG. 3. FIG. 11A illustrates the frequency characteristic with respect to each of the gain and the phase for the output of the ideal haptic output device, where a Q value is set to an integer having a value of 1 to 5.

Figure 11B:
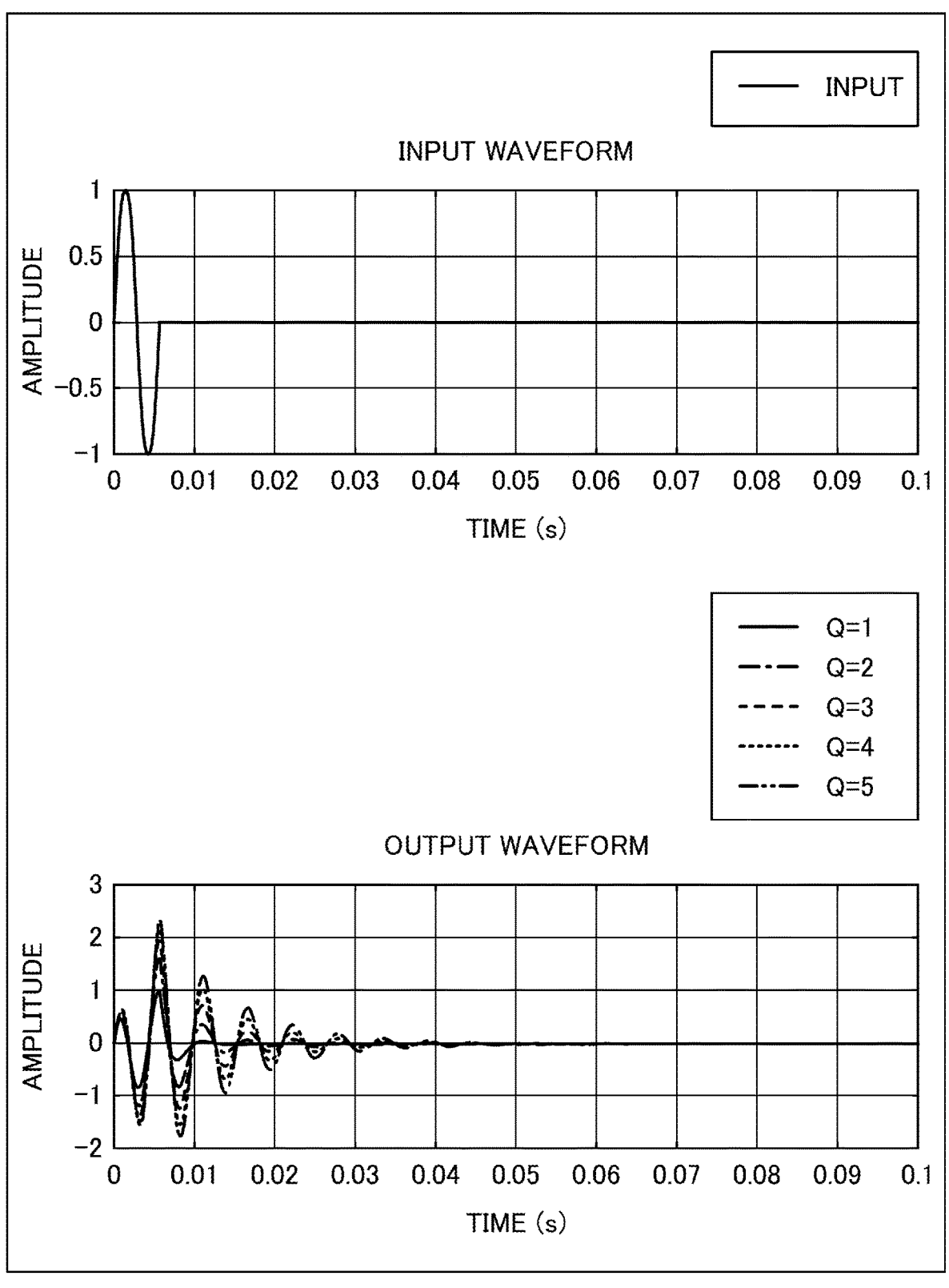
FIG. 11B is a diagram illustrating temporal changes (upper part) in a drive signal that is applied to the ideal haptic output device, as well as including temporal changes (lower part) in vibratory acceleration that is caused by the ideal haptic output device.

FIG. 11B is a diagram illustrating temporal changes in the drive signal (upper part) that is input to the ideal haptic output device, including temporal changes in vibratory acceleration (lower part) that is caused by the ideal haptic output device. For the acceleration caused by the ideal haptic output device, the Q value is set to an integer having a value of 1 to 5.

Figure 11C:
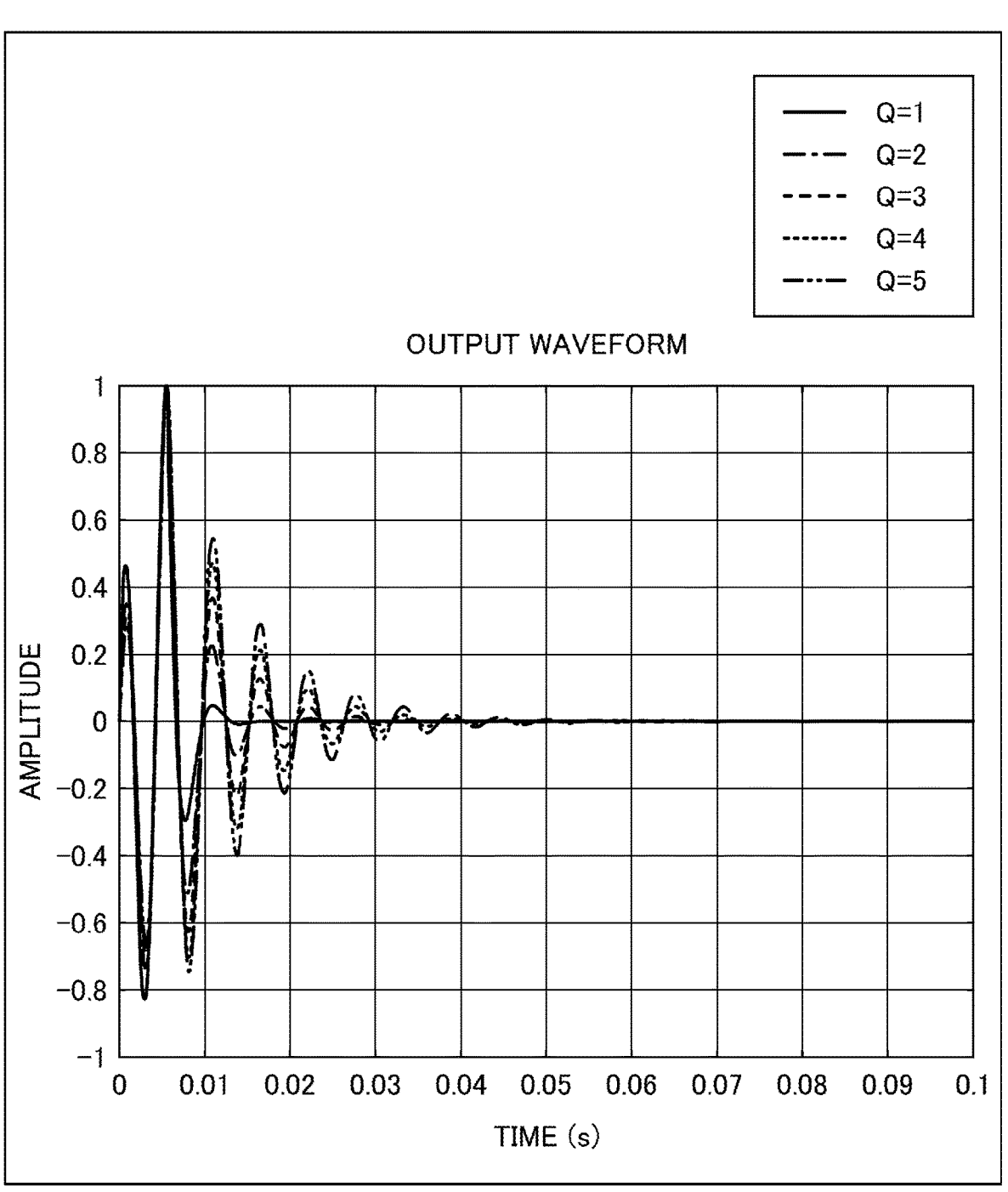
FIG. 11C is a diagram illustrating an example of the vibration of the panel that occurs immediately after the actuator of the haptic output device vibrates according to the embodiment.

FIG. 11C is a diagram illustrating an example of the vibration of the panel 130 that occurs immediately after the actuator 140 of the haptic output device 100 vibrates. FIG. 11C illustrates the characteristic of temporal changes in the vibration in the panel 130, where the Q value is set to an integer having a value of 1 to 5. In FIG. 11C, the horizontal axis represents the time (seconds), and the vertical axis represents the vibratory acceleration ($m/s^2$).

In accordance with an increasing Q value, changes in each of the gain and the phase (see FIG. 11A) of the output of the pseudo inverse filter 152 increase, and further, the amplitude of the vibratory acceleration (see FIG. 11B) of the actuator 140 increase. As a result, the vibratory acceleration (see FIG. 11C) of the panel 130 is increased. When the Q value is set to a value of 6 or more, the vibratory acceleration of the panel 130 (see FIG. 11C) is further increased. However, a longer time to attenuate the vibration of the panel 130 is required.

In view of the vibratory acceleration of the panel 130 (see FIG. 11C), an attenuation time period from the starting, to the dissipating, of the vibration is preferably within two to three periods of undulation. From this point of view, the Q value is preferably set to a value of 5 or less.

Although the haptic output device and the method for providing a haptic output are described above according to the embodiments of the present disclosure, the present disclosure is not limited to one or more specifically disclosed embodiments, and various modifications and changes can be made without departing from the scope of the present disclosure.

In the above embodiments, the following items are further described below.

(Item 1)

A haptic output apparatus includes:

a vibration system having one or more resonance frequencies, the vibration system including an actuator configured to vibrate in accordance with an input signal, and an object coupled to the actuator and configured to be excited in response to the vibration of the actuator; and a controller configured to control driving of the actuator, wherein the controller is configured to correct a drive signal using at least one correction model to output the corrected drive signal to the actuator as the input signal, the correction model being preliminarily generated based on the resonance frequencies, or output a control signal to the actuator as the input signal, the control signal being preliminarily generated using the correction model.

(Item 2)

In the haptic output device according to item 1, the correction model is based on an inverse of a transfer function including an input and an output, the input being configured to receive the input signal, and the output being configured to output a response characteristic of the object.

(Item 3)

In the haptic output device according to item 2, the correction model includes a model based on a pseudo inverse transfer function in which an unstable pole included in the inverse of the transfer function is changed to a stable pole, or

a model based on an inverse of a pseudo transfer function in which an unstable zero included in the transfer function is changed to a stable zero.

(Item 4)

In the haptic output device according to item 3, the stable pole is obtained by inverting a positive or negative sign of a real part related to the unstable pole, and the stable zero is obtained by inverting a positive or negative sign of a real part related to the unstable zero.

(Item 5)

In the haptic output device according to any one of items 1 to 4, the correction model reduces an effect of the resonance frequencies on a response characteristic of the object.

(Item 6)

In the haptic output device according to any one of items 1 to 5, the correction model includes a filter configured to set an upper limit on a gain with respect to a frequency that is lower than or equal to a first frequency, or a correction model that is restricted by the filter configured to set the upper limit on the gain with respect to the frequency that is lower than or equal to the first frequency.

(Item 7)

In the haptic output device according to any one of item 6, the first frequency is higher than or equal to 30 Hz and lower than or equal to 100 Hz.

(Item 8)

In the haptic output device according to item 6, the upper limit is greater than or equal to 20 dB and less than or equal to 30 dB.

(Item 9)

In the haptic output device according to any one of items 1 to 8, the correction model includes a low pass filter of which a cutoff frequency is a second frequency, or a correction model that is restricted by the low pass filter of which the cutoff frequency is the second frequency.

(Item 10)

In the haptic output device according to item 9, the second frequency is higher than or equal to 500 Hz and lower than or equal to 1 kHz.

(Item 11)

In the haptic output device according to any one of items 1 to 10, the vibration system includes a securing member coupled to the object, the vibration system includes a first vibration system including the actuator and the object, and a second vibration system including the object and the securing member, and the resonance frequencies include a first resonance frequency of the first vibration system, and a resonance frequency of the second vibration system.

(Item 12)

In the haptic output device according to any one of items 1 to 11, the object has an operation surface including a plurality of operation positions, and the at least one correction model includes multiple correction models in association with the respective operation positions, and the controller is configured to select a corresponding correction model among the multiple correction models, based on any operation position among the plurality of operation positions at which an operation is performed.

(Item 13)

A method for providing a haptic output using a haptic output apparatus that includes a vibration system having one or more resonance frequencies, the vibration system including an actuator, and an object configured to be excited in response to vibration of the actuator, the method including:

correcting a drive signal using a correction model to output the corrected drive signal to the actuator, the correction model being preliminarily generated based on the resonance frequencies, or outputting a control signal to the actuator as an input signal, the control signal being preliminarily generated using the correction model.

A haptic output device and a method for providing a haptic output that are capable of providing a good haptic feedback can be provided in a case where a vibration system including an actuator has one or more resonance frequencies.

What is claimed is:

1. A haptic output device comprising:

a vibration system having one or more resonance frequencies, the vibration system including an actuator configured to vibrate in accordance with an input signal, and an object coupled to the actuator and configured to be excited in response to the vibration of the actuator; and a controller configured to control driving of the actuator, wherein the controller is configured to correct a drive signal using at least one correction model to output the corrected drive signal to the actuator as the input signal, the correction model being preliminarily generated based on the resonance frequencies, or output a control signal to the actuator as the input signal, the control signal being preliminarily generated using the correction model, wherein the correction model is based on an inverse of a transfer function including an input and an output, the input being configured to receive the input signal, and the output being configured to output a response characteristic of the object, and wherein the correction model includes a model based on a pseudo inverse transfer function in which an unstable pole included in the inverse of the transfer function is changed to a stable pole, or a model based on an inverse of a pseudo transfer function in which an unstable zero included in the transfer function is changed to a stable zero.

2. The haptic output device according to claim 1, wherein the stable pole is obtained by inverting a positive or negative sign of a real part related to the unstable pole, and wherein the stable zero is obtained by inverting a positive or negative sign of a real part related to the unstable zero.

3. The haptic output device according to claim 1, wherein the correction model reduces an effect of the resonance frequencies on a response characteristic of the object.

4. The haptic output device according to claim 1, wherein the correction model includes a filter configured to set an upper limit on a gain at a frequency that is lower than or equal to a first frequency, or a correction model that is restricted by the filter configured to set the upper limit on the gain at the frequency that is lower than or equal to the first frequency.

5. The haptic output device according to claim 4, wherein the first frequency is higher than or equal to 30 Hz and lower than or equal to 100 Hz.

6. The haptic output device according to claim 4, wherein the upper limit is greater than or equal to 20 dB and less than or equal to 30 dB.

7. The haptic output device according to claim 1, wherein the correction model includes a low pass filter of which a cutoff frequency is a second frequency, or a correction model that is restricted by the low pass filter of which the cutoff frequency is the second frequency.

8. The haptic output device according to claim 7, wherein the second frequency is higher than or equal to 500 Hz and lower than or equal to 1 kHz.

9. The haptic output device according to claim 1, wherein the vibration system includes a securing member coupled to the object, and wherein the vibration system includes a first vibration system including the actuator and the object, and a second vibration system including the object and the securing member, and wherein the resonance frequencies include a first resonance frequency of the first vibration system, and a second resonance frequency of the second vibration system.

10. The haptic output device according to claim 1, wherein the object has an operation surface including a plurality of operation positions at different locations on the operation surface, wherein the at least one correction model includes multiple correction models in association with the respective operation positions, and wherein the controller is configured to select a corresponding correction model among the multiple correction models, based on any operation position among the plurality of operation positions at which an operation is performed.

11. A method for providing a haptic output using an apparatus that includes a vibration system having one or more resonance frequencies, the vibration system including an actuator, and an object configured to be excited in response to vibration of the actuator, the method comprising:

correcting a drive signal using a correction model to output the corrected drive signal to the actuator, the correction model being preliminarily generated based on the resonance frequencies, or outputting a control signal to the actuator as an input signal, the control signal being preliminarily generated using the correction model, wherein the correction model is based on an inverse of a transfer function including an input and an output, the input receiving the input signal, and the output outputting a response characteristic of the object, and wherein the correction model includes a model based on a pseudo inverse transfer function in which an unstable pole included in the inverse of the transfer function is changed to a stable pole, or a model based on an inverse of a pseudo transfer function in which an unstable zero included in the transfer function is changed to a stable zero.

\* \* \* \* \*